May 29, 1956
W. N. PLATTE ET AL
2,748,380
RESISTANCE WELDING CURRENT INDICATING DEVICE
Filed June 26, 1952
2 Sheets-Sheet 1
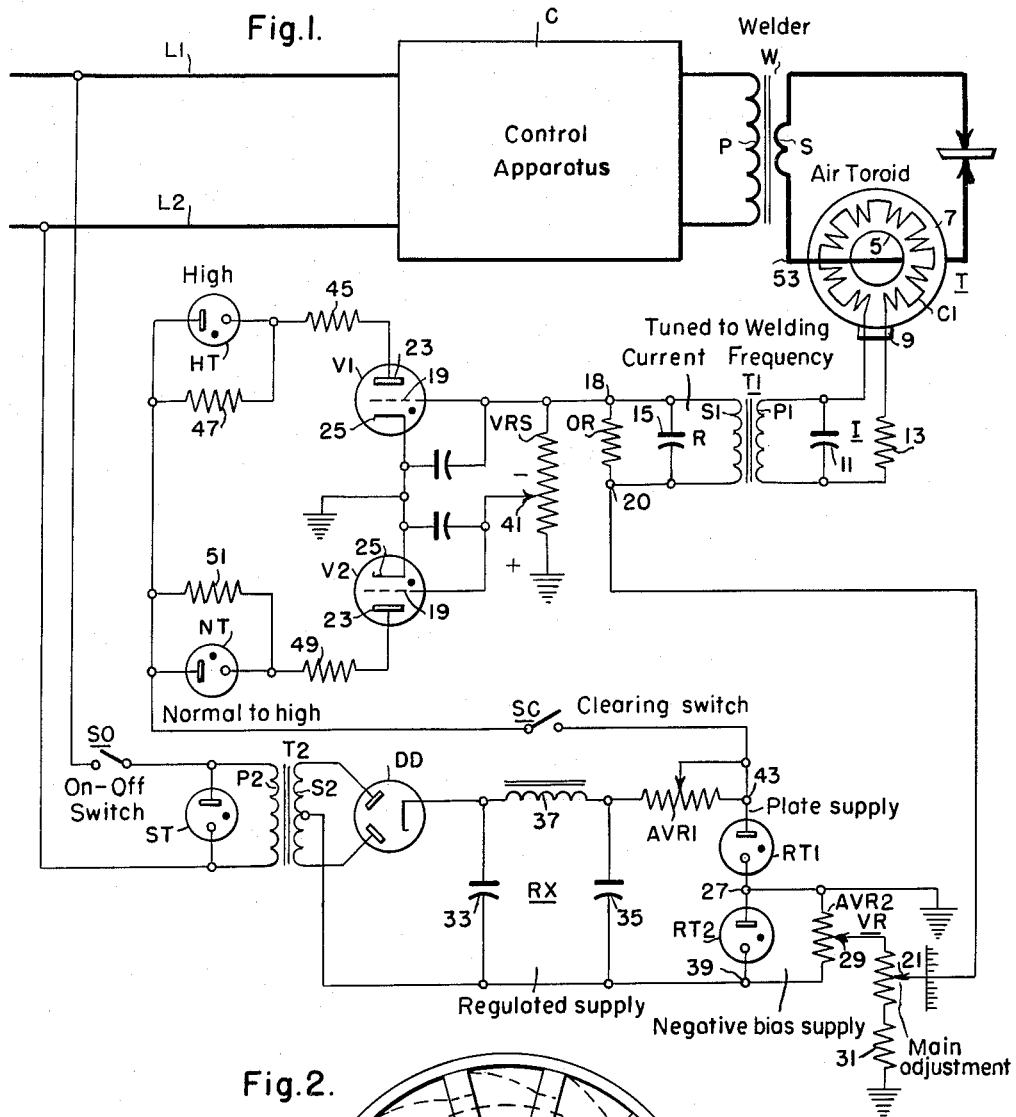
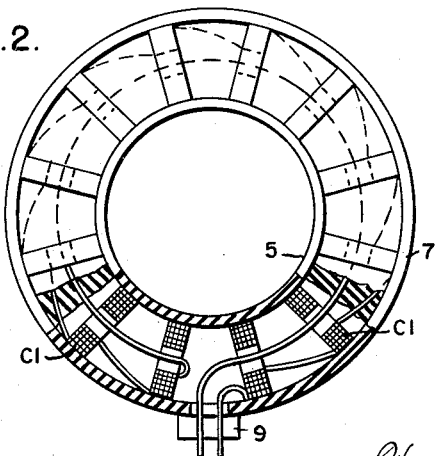
WITNESSES:
E. G. McCloskey.
Leon J. Taza
INVENTORS
William N. Platte
and William L. Roberts.
BY
Hyman Diamond
ATTORNEY May 29, 1956 W. N. PLATTE ET AL 2,748,380
RESISTANCE WELDING CURRENT INDICATING DEVICE
Filed June 26, 1952 2 Sheets-Sheet 2

WITNESSES:
E. A. McCloskey.
Leon J. Vaja.

INVENTORS
William N. Platte
and William L. Roberts.
BY
Hymen Diamond
ATTORNEY

United States Patent Office

2,748,380
Patented May 29, 1956

2,748,380
RESISTANCE WELDING CURRENT INDICATING DEVICE

William N. Platte and William L. Roberts, McKeesport, Pa., assignors to Westinghouse Electric Corporation, East Pittsburgh, Pa., a corporation of Pennsylvania Application June 26, 1952, Serial No. 295,644

18 Claims. (Cl. 340—253)

Our invention relates to electric discharge apparatus and has particular relation to apparatus for indicating the magnitude of the welding current which flows in resistance welders.

In recent times, resistance welding has come into extensive use for joining materials of ever increasing variety. As the use has grown, the necessity for an accurate reliable welding current indicator has increased. While such an indicator is generally desirable, there are situations in which it is entirely indispensable. For example, certain applications of resistance welding, such as the welding of air frames, require that a series of welds made in producing a joint have a given consistency of quality throughout the joint. In such situations, a single weld, not meeting the requirements, may result in the scrapping of the welded assembly in which it is included, a highly costly procedure. The cost of scrapping material prohibits the use of welding in such situations unless there is an accurate welding current indicator adapted to monitor the welding operation continuously and to predict an improper weld before the material being welded is damaged beyond repair. Conversely, to the extent that an accurate indicator for monitoring welding current is available, resistance welding becomes applicable to more and more welding problems.

In providing a welding current indicator, consideration must be given to the character of the welding current. This current is usually derived from a single phase or a polyphase commercial supply having a frequency of the order of 60 cycles per second and is supplied at the 60 cycle frequency or at a lower frequency. Whatever the frequency, the welding current is not supplied continuously; it is supplied in bursts or trains, each of which may have a duration which is usually of from ½ to 30 periods of the supply but may be as high as several seconds or even higher. The welding current is usually supplied through discharge devices, such as ignitrons, the conduction of which is initiated abruptly at certain instants in the periods of the supply. By this mode of conduction, the heat supplied for welding purposes may be readily varied over a wide range, and it is aptly called heat control. Because of the intermittent character of the welding current and the heat control, the wave form of the individual waves of a burst or train, as well as the welding current as a whole, is not sinusoidal but irregular, having a high harmonic content. The abovedescribed properties of the resistance welding apparatus naturally impose difficulties on the provision of a suitable reliable welding current indicator.

Indicators provided in accordance with the teachings of the prior art have proved to a large extent unsatisfactory. Such indicators have, in particular, failed to yield indications sufficiently accurate for industrial purposes in situations in which the welding current is relatively high.

It is accordingly an object of our invention to provide an accurate and reliable welding current indicator.

Another object of our invention is to provide an indicator suitable for practical use in situations in which a series of welds having a given consistency of quality are to be made.

Our invention arises from certain discoveries made in an extensive study of the prior art indicators, which we have carried out. This study involved both experimental and theoretical investigation of prior art indicators and has resulted in our developing certain principles which we have applied in arriving at our invention.

Among the indicators which are available in accordance with the teachings of the prior art is a meter of the so-called pointer stop type. Such a meter is coupled to the primary of the welding transformer through a current transformer. This meter would provide reasonably satisfactory indications of welding current, if the current were of the sine wave type. We have discovered that since the current is of irregular wave form, the meter is highly inaccurate, and its accuracy becomes poorer as the duty cycle, set by the heat control, decreases. In addition, the measurement of the welding current is indirect since the current transformer is coupled to the primary. Losses in the welding transformer must because of such a coupling be estimated and the estimation of these losses for different welding situations introduces large inaccuracies.

The proposal has also been made to derive the signal for operating a meter from the secondary of the welding transformer. This signal has been in the past derived through an iron cored toroid. The usefulness of such a toroid is relatively limited since if it is of reasonable dimensions its iron tends to become saturated for high currents, and such an indicator must then be operated at relatively low currents to avoid saturation, and if saturation is to be avoided the toroid is bulky.

Reports on the use of an air toroid for measuring welding current appear in the following publications among others:

1. Hipperson, A. J., "A Mains Operated Valve Voltmeter for Measurement of Secondary Current in Resistance Welding Machines," Welding Research (British Welding Research Assn.), Trans. Welding Inst. (April, June 1948).

2. Richter, W., "An Instrument for the Measurement of Large Alternating Currents," AIEE Trans., 63, 38–40 (January 1944).

3. McMaster, R. C., and Begovitch, N. A., "Instrumentation of the Spot Welder and Investigation of the Spot Welding of 0.091-In.-0.091-In. 24S-T Alclad Sheet," The Welding Journal, 24 (10), Research Suppl., 531-s to 556-s (1945).

4. McMaster, R. C., and Begovitch, N. A., "Spot Welding of Heavier Gages of Aluminum Alloy. Part II. New Portable Instruments for Rapid Measurement of Current and Tip Force in Spot-Welding Machines," Ibid., 24 (12), Research Suppl., 644-s to 652-s (1945).

The apparatus disclosed in these publications has not proved satisfactory in the case of welding apparatus operating at less than 100% heat when the wave form is irregular.

Our further activity in this field resulted in the development of an indicator including a meter and relatively complex amplifying equipment. In experimenting with this apparatus, we found that it is too complex for use in an ordinary plant, has a tendency to drift, and requires constant supervision and recalibration.

It is accordingly a specific object of our invention to provide an accurate and reliable welding current indicator of simple structure which is readily operable even by an inept operator, which is unaffected by changes in the wave shape produced by changing heat control which is free from drift, and which maintains its calibration.

Another specific object of our invention is to provide a novel electronic circuit.

A further specific object of our invention is to provide apparatus for converting a signal of irregular wave form into a substantially sinusoidal signal having an amplitude proportional to the magnitude of the signal of irregular wave form.

In accordance with the broad aspects of our invention, we provide a system in which a potential signal proportional to the welding current is derived directly from the secondary of the welding transformer through an air-corded toroid. Since the toroid is coupled to the secondary of the welding transformer, the error heretofore introduced by coupling to the primary is eliminated. Since the toroid is of the air cored type, it does not become saturated and is capable of delivering reliable signals for high welding currents. In the parctice of our invention, we have produced reliable indicating for welding currents as high as 40,000 amperes.

The potential delivered by the air-cored toroid is proportional to the first derivative of the welding current rather than to the magnitude of the welding current. In accordance with the preferred practice of our invention, the potential derived from the toroid is accordingly impressed on an integrating circuit so as to derive a potential proportional to the welding current. Because of the effect of heat control, the wave form of the potential available at the output of the integrating circuit is irregular and has a high harmonic content. It is desirable to derive from this integrated potential a potential in some way proportional to the welding current. An important contributing factor to our invention is our discovery that a resonant network tuned to the frequency of the individual pulses of the welding current wave train, connected to the output of the integrating circuit produces corresponding pulses the peaks (or amplitudes) of which are proportional to the RMS magnitude of the welding current and such a network is in accordance with our invention connected to the output of the integrating network. In the usual situation where a single-phase welder operating at commercial frequency is involved, the network would be tuned to a frequency of 60 cycles per second. For welders operating at lower-than-commerical frequencies the network would be tuned to the lower frequencies.

The output of the tuned network is a peak potential the amplitude of which is proportional to the welding current producing the toroid signal. The accuracy of this proportionality depends on the extent to which the harmonic content of the integrated signal manifests itself in the signal produced by the resonant network, and it becomes the less accurate the more the harmonics are attenuated in the resonant network. For any resonant network, the accuracy of the proportionality to the welding current decreases as the harmonic content of the integrated signal increases. Thus, if the resonant network were sharply tuned so as to substantially suppress harmonics in its input signal, the peak signal produced across it would deviate from proportionality to the welding current to a greater and greater extent, as the duty cycle decreases. We have found by actual measurement that where such a resonant network is accurate at 100% duty cycle, the signal produced at 70% duty cycle would be too low by 7.8%, and at 40% duty cycle the signal would be too low by 30%.

It is accordingly essential that the resonant network be such as to produce a potential which includes harmonic components. We have found that a resonant circuit having a low Q, that is, a low ratio of reactance to resistance satisfactorily introduces the harmonics. Thus, a circuit having a Q of the order of 1.06 produces a signal which includes 1/3 of the peak amplitude of the third harmonic and approximately 1/5 of the peak amplitude of the fifth harmonic. Such a circuit has been found suitably accurate for our purposes.

The peak or amplitude of the voltage across the resonant network is proportional to the welding current. We provide a circuit responsive to this amplitude (rather than to the R. M. S. magnitude) to indicate the magnitude of the welding current. This circuit is of the trigger type. In accordance with the specific aspects of our invention, the output of the resonant network is connected to control the conductivity of a pair of thyratrons. Each of these thyratrons has impressed thereon a negative biasing potential which normally maintains it non-conductive. The potential impressed on one thyratron is higher than that impressed on the other.

These potentials are derived through a pair of variable impedances. One of these impedances is common to the two thyratrons and determines the order of the magnitude of these potentials. The other bias is set by a second variable impedance which determines only the difference between the two potentials. The first impedance is set to correspond to the desired welding current; the second impedance to correspond to the permissible range of variation of the welding current. The output of the resonant network is connected in circuit with the bias impedances in such a sense that the potential derived from it tends to counteract these bias. The counteracting effect depends not on the average value of this resonant potential but on its peak value. If for any setting of the variable impedances the potential derived from the resonant network counteracts the lower biasing potential, only one of the thyratrons is rendered conductive. If it counteracts both biasing potentials, both thyratrons are rendered conductive.

The first biasing potential is set to correspond to the lower permissible limit of the welding current. Accordingly, the conduction of the first thyratron indicates that the welding current is not too low. The second biasing potential is so set as to correspond to the permissible range of welding current, and the conduction of the second thyratron when this potential is counteracted indicates that the welding current is greater than the permissible upper limit. The magnitude of the second biasing potential thus determines the sensitivity of the indicator, and the second impedance is set in accordance with the desired sensitivity. If the materials to be welded are such that a wide variation in current is permissible, the second impedance may be set so as to introduce a high difference in bias between the first and the second thyratrons. Where the welding current may be precise within very narrow limits, the second impedance must be set so that the bias on the second thyratron exceeds that on the first thyratron by only a small magnitude.

Indicators may be connected in the circuits of the first and second thyratrons to indicate when they are conductive. Glow tubes are suitable for this purpose.

While an air-cored toroid is preferred in accordance with our invention, there are situations in which an iron-cored toroid may be used to derive a signal from the secondary of a welding transformer. In such situations the output of the toroid is directly coupled to the resonant network and the integrating network is eliminated.

The novel features that we consider characteristic of our invention are set forth generally above. The invention itself, both as to its organization and its method of operation, together with additional objects and advantages thereof, will be understood from the following description of a specific embodiment when read in connection with the accompanying drawings, in which:

Figure 1 is a circuit diagram showing a preferred embodiment of our invention;

Fig. 2 is a view, partly in section and partly in elevation, of a toroid in accordance with our invention.

Figure 3:
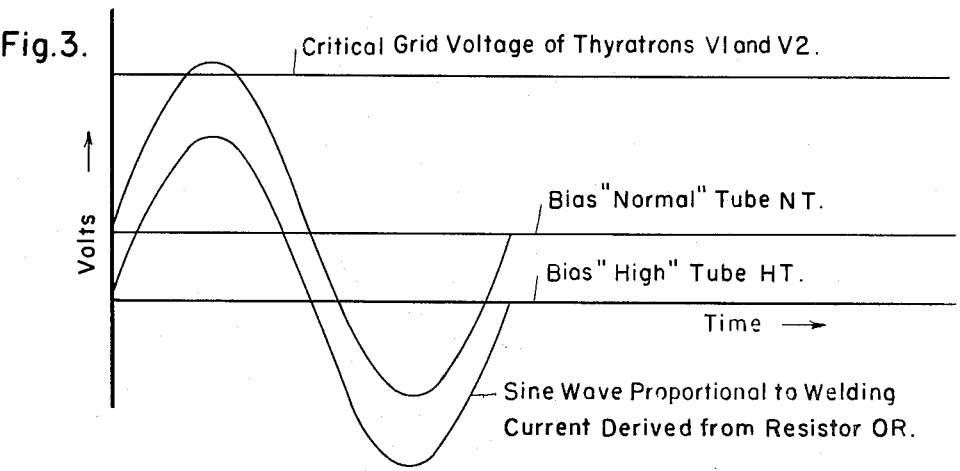
Figs. 3 and 4 are graphs illustrating the operation of our invention.

The apparatus shown in Fig. 1 includes an air toroid T which is shown as coupled to the secondary S of a welding transformer W. The primary P of the transformer is supplied from buses L1 and L2 of a commercial supply through control apparatus C of the usual type. Such apparatus includes discharge devices (not shown) which are rendered conductive abruptly at preset instants in the periods of the supply for heat control purposes.

The toroid T consists of a plurality of pancake coils C1 mounted between a pair of concentric cylinders 5 and 7 of insulating material. The coils C1 are connected in series and their output is derived at a connector 9 mounted on the outer cylinder 7.

The output of the toroid is connected to an integrating network I consisting of a capacitor 11 and a resistor 13 of proper relative magnitudes connected in series. The potential on the capacitor 11 produced by the signal derived at the toroid is proportional to the integral of this signal which is in turn proportional to the current flowing through the secondary S. Across the capacitor 11, the primary P1 of a transformer T1, which may be called the input transformer, is connected. The secondary S1 of this transformer is tuned by a capacitor 15 to the frequency of the welding current. The frequency of this network is 60 cycles for the ordinary single-phase welder, but in the case of a low frequency welder may be equal to the low frequency at which the welding current is supplied. Across the network R, a resistor OR which may be called an output resistor is connected.

A potential pulse is produced across this resonant network R (or the resistor OR) for each half wave of the welding current when a signal is impressed on the toroid T. The peak of this resonant potential may be proportional to the secondary welding current with reasonable accuracy, if components of the third and fifth harmonics of the signal produced at the integrating circuit are present in the potential across the resonant circuit. To achieve this object, the resonant circuit has a relatively low Q of the order of 1.

The output resistor OR is connected directly at one terminal 18 to the control electrode 19 of a first thyratron V1 and at the other terminal 20 to the adjustable tap 21 of a variable resistor VR which may be called the main adjustment resistor. The thyratron V1 has in addition to the control electrode 19 an anode 23 and a cathode 25.

The main adjustment resistor VR is supplied with direct current from a regulated direct current supply RX. The regulated supply is derived from a transformer T2 acoss the primary P2 of which an indicator tube ST is connected. This primary P2 is supplied from the main buses through an on-off switch SO. The supply RX includes a double diode DD connected across the secondary S2 of the transformer T2 and having a pair of filtering capacitors 33 and 35 and a filtering reactor 37 connected to its output. The output of this supply RX is impressed through an auxiliary variable resistor AVR1 across a pair of voltage regulator tubes RT1 and RT2. The junction 27 between these tubes is grounded. A further auxiliary variable resistor AVR2 is connected across the most negative tube RT2, and the adjustable tap 29 of this resistor is connected to the main adjustment resistor VR which is connected to ground through a fixed range setting resistor 31. It is seen that lower terminal 39 of the rectifier RX and the tap 29 are negative with respect to ground and that the tap 21 is also negative with respect to ground.

The terminal 18 of the output resistor OR is also connected to ground through another variable resistor VRS which may be called the sensitivity adjustment resistor. The variable tap 41 of the sensitivity adjustment resistor VRS is connected to the control electrode 19 of a second thyratron V2 which also has an anode 23 and a cathode 25.

The thyratrons V1 and V2 are supplied with potential from the regulated direct-current supply RX and their anodes 23 are each connected to the positive terminal 43 of the supply RX through a pair of anode resistors 45 and 47 and 49 and 51, respectively, and through a switch SC which may be called a clearing switch. This switch SC is capable of opening the anode circuits of the thyratrons V1 and V2 to render them non-conductive. One resistor 47 and 51 of each pair is shunted by an indicator glow discharge tube HT and NT, respectively. The cathodes 25 of the thyratrons V1 and V2 are connected together and are grounded.

The various resistors AVR2, VR and VRS are so selected and are so connected to the regulated supply RX that the main adjustment resistor impresses a negative bias of substantial magnitude in series with the output resistor OR. In the absence of a signal, this bias is impressed directly on the control electrode 19 of the first thyratron V1. This bias is also impressed through the sensitivity adjustment resistor VRS on the control electrode 19 of the second thyratron V2. The resistor VRS is capable of introducing a relatively low difference of potential between the two control electrodes 19 causing the control electrode of the second thyratron V2 to be slightly less negative than the control electrode of the first thyratron V1.

The relationship between the potentials impressed on the control electrodes 19 of the thyratrons V1 and V2 is shown in Fig. 3. In the graph shown in this view, the voltage in the control circuits of the thyratrons V1 and V2 is plotted vertically, and time is plotted horizontally. The critical grid voltage of each of the thyratrons is represented by the upper horizontal line, the bias impressed on the second thyratron V2 by the central horizontal line and the bias impressed on the first thyratron by the lowest horizontal line. The voltage derived across the output resistor OR is represented by two sine curves, one having its base on the central horizontal line and the other having its base on the lowest horizontal line. The peaks of these curves are shown to be at such a height that the upper one intersects the critical voltage line and the lower one does not. For the conditions represented by these curves, the second thyratron V2 conducts and the first thyratron does not, indicating that the welding current is of the desired magnitude. If the amplitude of the upper sine wave should drop so that it does not intersect the critical line, neither thyratron would conduct to indicate that the welding current is too low. If the lower curve should rise to such a high amplitude as to intersect the critical line, both thyratrons would conduct and indicate that the current is too high. The distance between the peaks of the two sine waves corresponds to the permissible range of the welding current. This range may be set by the sensitivity adjustment resistor VRS. Different thyratrons may have somewhat different critical potentials, but this difference may be taken in consideration in the setting of the sensitivity resistor VRS.

Apparatus, which we have found to operate satisfactory, includes the following components.

| | |
|---|---|
| Double diode DD | 5Z4. |
| First filtering capacitor 33 | 8 microfarads. |
| Filtering choke 37 | 8 henries at 450 cycles. |
| Second filtering capacitor 35 | 8 microfarads. |
| Auxiliary variable resistor AVR1. | 5,000 ohms adjusted to approximately 3,000 ohms. |
| Regulator tube RT1 connected to positive terminal 43. | VR150. |
| Regulator tube RT2 connected to negative terminal 39. | VR75 |
| Auxiliary variable resistor AVR2 across latter regulator (RT2). | 20,000 ohms. |
| Main adjustment resistor | 50,000 ohms. |
| Range setting resistor | 40,000 ohms. |
| Toroid | capable of delivering approximately 1,000 volts at 40,000 amperes secondary welding current. |

| | |
|---|---|
| Integrating network resistor 13 | 20,000 ohms. |
| Integration network capacitor 11. | 32 microfarads. |
| Input transformer T1 | 1 to 10 ratio approximately 250 ohms. impedance at 60 cycles. |
| Tuning capacitor 15 | .15 microfarad. |
| Output resistor OR | 51,000 ohms. |
| Sensitivity adjustment resistor VRS. | 30,000 ohms. |
| Thyratrons V1 and V2 | type 884. |
| First anode resistor 45, 49 | 30,000 ohms. |
| Second anode resistor 47, 51 | 100,000 ohms. |

When the indicator in accordance with our invention, is used, the toroid T is mounted so that it encloses a secondary conductor 53 of the welding transformer T1. To facilitate the proper mounting of the toroid T, it may be of hinged construction. Once the toroid is properly mounted, the main adjustment resistor VR may be set to correspond to the desired welding current and the sensitivity adjustment resistor VRS to correspond to the desired permissible range of welding current. The clearing switch SC and the on-off switch SO may then be closed.

A trial welding operation may now be carried out. During this operation, a potential is produced across the output terminals of the toroid T. This potential is impressed in the control circuits of the first and second thyratrons V1 and V2 through the output resistor OR. If the welding current is of the desired magnitude, only the negative bias derived from the resistors VR and VRS at the tap 41 is counteracted, but the bias derived at the tap 21 alone is not counteracted and only the second thyratron V2 is rendered conductive. The glow tube NT in its anode circuit indicates that the welding current is of the proper magnitude. If the welding current is higher than the proper magnitude, both the negative bias impressed on the first thyratron from the tap 21 and the lower bias derived from tap 41 are counteracted, and both the first and second thyratrons V1 and V2 conduct. Both glow tubes NT and HT are then energized to indicate that the welding current is high. If the welding current is lower than the desired magnitude, neither the negative bias impressed on the second thyratron V2 from tap 41 nor the negative bias impressed on the first thyratron V1 from tap 21 are counteracted and neither of the glow tubes NT or HT are energized. In this way, there is an indication that the current is too low.

At the end of the trial welding operation, the clearing switch SC is opened and the thyratrons V1 and V2 are rendered non-conductive to reset the apparatus for another operation. If the indicator during the first trial operation showed that the welding current was of improper magnitude, the control apparatus C is reset and another trial operation carried out. The trial welding operations are thus continued until the indicator shows that the control for the welder is set for the proper magnitude.

Once the control apparatus for the welder is set for the proper magnitude, the clearing switch SC and the off-on switch SO may be maintained closed, and the welding operation carried out.

The switch SC is shown symbolically as a manual switch. It may be a switch, such as a rotating switch, which is automatically actuable to open and reclose the welding circuit as the welding operation progresses. Such a switch SC would be used where a welding operation is to be monitored so that the indicator can be repeatedly reset. During such a monitoring operation, the toroid T is maintained coupled to conductor 53 and the state of the indicators NT and HT is noted as the welding proceeds. If both NT and HT should become energized or extinguished, the operator knows that the current is either too high or too low as the case may be. Under such circumstances, he may stop the welding operation and reset the control apparatus. The indicator with an automatically actuable switch SC in it may be interconnected with the control apparatus C so that in situations in which the indication is that the welding current is of improper magnitude, the supply of welding current may be interrupted automatically. Such interconnection is within the scope of our invention.

The practicability of the apparatus can be realized from a consideration of the magnitudes of the actual potentials impressed in the indicator circuit. Let us assume, for example, that the desired welding current is of such magnitude that a potential of approximately 800 volts appears at the terminals of the toroid T. The resistor in the integrating network has a resistance of 20,000 ohms. The impedance of the integrating capacitor 11 and the transformer P1 is of the order of 70 ohms at 60 cycles. Since the input voltage is 800 volts, the voltage impressed across the primary P1 is of the order of 2½ volts. The transformer has a ratio of 10 to 1, and the voltage impressed across the secondary of this transformer is of the order of 25 volts R. M. S. The peak voltage delivered across the resistor OR is then of the order of $1.4 \times 25$ volts or 35 volts. The main adjustment resistor VR is in such a situation set to impress the bias exceeding 35 volts by a predetermined magnitude corresponding to the permissible range of variation in the welding current in the control circuit of the thyratrons V1 and V2, and the sensitivity adjustment resistor VRS is set to impress a bias of the order of 35 volts in the control circuit of the second thyratron V2. Welding current capable of producing 800 volts at the output of the toroid would then cause the second thyratron V2 to become conductive, if of the proper magnitude. If it exceeded this magnitude, the first thyratron would also become conductive, and if the current were lower than the desired magnitude, neither thyratron would become conductive. The 35 volts available in the secondary of the transformer are adequate for positive control of the thyratrons V1 and V2 and are so large that variations in the circuit and thyratron characteristics are negligible for practical purposes. The operation of the apparatus is then reasonably accurate. In fact, we found this apparatus to operate satisfactorily for welding currents ranging from 7,400 to 25,500 amperes with an error of only plus or minus 500 amperes.

So that the indicator in accordance with our invention may be used readily, it must be calibrated so that it may be set for different welding currents. During this calibration process, the main adjustment resistor is marked to correspond to the various currents desired, and the sensitivity adjustment resistor may be correspondingly marked to correspond to the ranges of current which may be desired.

For convenience, the calibration is effected indirectly by impressing potentials on the integrating network I rather than by coupling the toroid T to a welding network and transmitting currents of various magnitudes through this network. The relationship between the voltages impressed on the integrating networks and the welding currents may be deduced from the equation:

$$e = 2\pi M f I$$

where $e$ is the voltage produced at the output terminals of a toroid T having mutual inductance M for welding current flowing through the secondary P1 at frequency $f$. Where M and $f$ are known, the secondary welding current I may be determined for various values of $e$.

During the calibrating operation, the sensitivity adjustment resistor VRS is adjusted so that confusion by the conduction of thyratrons V1 and V2 simultaneously is avoided. Potentials ($e$) of different magnitudes are then impressed on the integrating network I, and the main adjustment resistor VR is set for each magnitude ($e$) so that the thyratron V1 just becomes conductive as indicated by tube NT while thyratron V2 remains non-conductive. The dial of the main adjustment resistor VR may then be marked to correspond to the secondary welding current (I) corresponding to the potentials (e) impressed.

Figure 4:
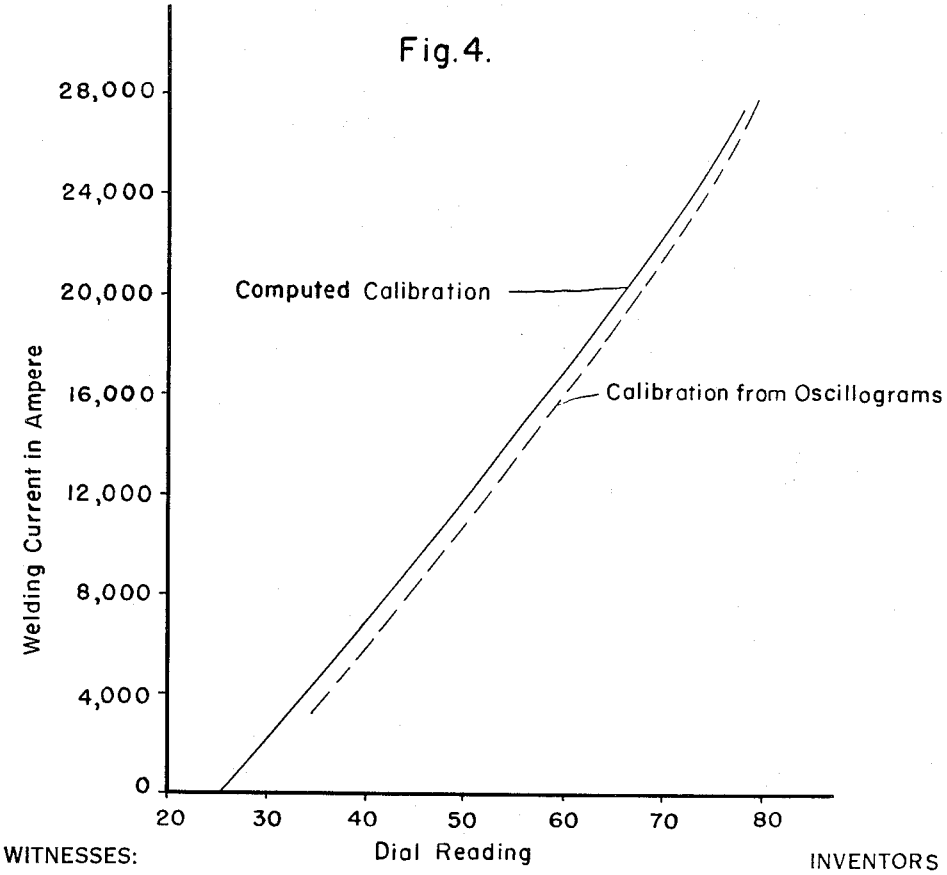

Fig. 4 illustrates the accuracy of the calibration for an indicator in accordance with our invention which we made. In this view, welding current in thousands of amperes is plotted vertically, and the dial reading on the main adjustment resistor VR is plotted horizontally. The full line curve is a plot of the welding current as a function of the dial reading. The broken line curve is a plot of the welding current as measured by means of an oscillogram for different settings of the main adjustment resistor VR. The measurements from the oscillograms being direct are more accurate than the calculated calibration. However, the difference is relatively small being of the order of 1,000 amperes at dial reading 40, which corresponds to about 6,000 amperes.

It is seen that the welding current indicator in accordance with our invention is accurate and reliable because it measures the welding current directly, and the results which it yields, are not confused by the error of the welding transformer. Because the signal from the welding current is derived from an air toroid, our indicator may be used in situations in which the welding current is high. The signal derived from the toroid is of the order of 1,000 volts, and for this reason a signal of substantial magnitude is available to control the thyratrons. An accurate indication of the magnitude of the welding current is thus provided. The indicator has only three simple operating components, the on-off switch SO, the variable resistor VR and the switch SC (unless it is automatic). The sensitivity resistor VRS is usually provided with a screw driver adjustment since the sensitivity is reset only on occasions, for example, when components are replaced or when material of a special character, such as stainless steel, is to be welded.

While we have shown and described a certain specific embodiment of our invention, many modifications thereof are possible. Our invention, therefore, is not to be limited except in so far as is necessitated by the prior art.

We claim as our invention:

1. A resistance-welding current indicator including an air toroid adapted to be coupled to the welding circuit; an integrating network connected to said air toroid; a resonant network connected to said integrating network; a first discharge device having a pair of principal electrodes and a control electrode; a second discharge device having a pair of principal electrodes and a control electrode; a first biasing means for supplying a first bias potential in circuit with the control electrode of said first device; a second biasing means for supplying a second bias potential of greater magnitude than said first biasing potential in circuit with said control electrode of said second device; means for connecting the output of said resonant network in circuit with the control electrodes of both said devices to tend to counteract said first and second biasing potentials; indicating means in circuit with the principal electrodes of said first and second devices and means cooperative with said first and second biasing means to set said biasing means so that said devices indicate that the welding current lies between desired limits.

2. A resistance welding current indicator including a circuit for deriving a potential signal proportional to the root means square of the welding current during any welding interval; a first discharge device having a pair of principal electrodes and a control electrode; a second discharge device having a pair of principal electrodes and a control electrode; a first biasing means for supplying a first bias potential in circuit with the control electrode of said first device; a second biasing means for supplying a second bias potential of greater magnitude than said first biasing potential in circuit with said control electrode of said second device; means for impressing said signal in circuit with the control electrodes of both said devices to tend to counteract said first and second biasing potentials; indicating means in circuit with the principal electrodes of said first and second devices and means cooperative with said first and second biasing means to set said biasing means so that said devices indicate that the welding current lies between desired limits.

3. Apparatus according to claim 2 characterized by the fact that the cooperative means may be so set that the first biasing potential only is just counteracted by the signal when the welding current is just of the desired magnitude and the second biasing potential is just counteracted by the signal when the welding current just exceeds the desired magnitude, and by the fact that the indicating means operates accordingly.

4. Apparatus according to claim 2 characterized by the fact that the welding circuit includes a welding transformer having a primary and a secondary, and the deriving circuit includes an air toroid adapted to be coupled to said secondary.

5. A resistance-welding current indicator for a welding circuit having a welding transformer with a primary and a secondary including an air toroid adapted to be coupled to the secondary; an integrating network connected to said air toroid; a resonant network connected to said integrating network; a first discharge device having a pair of principal electrodes and a control electrode; a second discharge device having a pair of principal electrodes and a control electrode; a first biasing means for supplying a first bias potential in circuit with the control electrode of said first device; a second biasing means for supplying a second bias potential of greater magnitude than said first biasing potential in circuit with said control electrode of said second device; means for connecting the output of said resonant network in circuit with the control electrodes of both said devices to tend to counteract said first and second biasing potentials; indicating means in circuit with the principal electrodes of said first and second devices and means cooperative with said first and second biasing means to set said biasing means so that said devices indicate that the welding current lies between desired limits.

6. In combination, a welding transformer having a primary and a secondary; an air toroid coupled to said secondary; a first thyratron having an anode, a cathode and a control electrode; a second thyratron having an anode, a cathode and a control electrode; a first biasing means for impressing a first biasing potential between said control electrode and said cathode of said first thyratron; a second biasing means for impressing a potential of greater magnitude than said first potential between said control electrode and said cathode of said second thyratron; means for connecting said toroid in circuit with said control electrodes and said cathodes of said thyratrons and said first and second biasing means and means common to said first and second thyratrons for supplying anode-cathode potential thereto.

7. An indicator for a resistance-welding circuit which derives its power from an alternating current source including an air toroid adapted to be coupled to the welding circuit; an integrating network connected to said air toroid; a resonant network tuned to the frequency of said source and having a Q equal to approximately 1 connected to said integrating network; a first discharge device having a pair of principal electrodes and a control electrode; a second discharge device having a pair of principal electrodes and a control electrode; a first biasing means for supplying a first bias potential in circuit with the control electrode of said first device; a second biasing means for supplying a second bias potential of greater magnitude than said first biasing potential in circuit with said control electrode of said second device; means for connecting the output of said resonant network in circuit with the control electrodes of both said devices to tend to counteract said first and second biasing potentials; indicating means in circuit with the principal electrodes of said first and second devices and means cooperative with said first and second biasing means to set said biasing means so that said devices indicate that the welding current lies between desired limits.

8. An indicator for indicating the R. M. S. magnitude of the welding current, of a resistance welding circuit which derives its power from an alternating current source including means for deriving from said resistance welding circuit a potential proportional to the welding current flowing therein; a resonant network tuned to the frequency of said source and having a Q equal to approximately 1 connected to the output of said deriving means for deriving a peak potential the amplitude of which is substantially proportional to the welding current R. M. S. magnitude; a first discharge device having a pair of principal electrodes and a control electrode; a second discharge device having a pair of principal electrodes and a control electrode; a first biasing means for supplying a first bias potential in circuit with the control electrode of said first device; a second biasing means for supplying a second bias potential of greater magnitude than said first biasing potential in circuit with said control electrode of said second device; means for connecting the output of said resonant network in circuit with the control electrodes of both said devices to tend to counteract said first and second biasing potentials; indicating means in circuit with the principal electrodes of said first and second devices and means cooperative with said first and second biasing means to set said biasing means so that said devices indicate that the welding current lies between desired limits.

9. An indicator for a resistance-welding circuit which derives its power from an alternating current source including an air toroid adapted to be coupled to the welding circuit; an integrating network connected to said air toroid; a resonant network tuned to the frequency of said source and having a Q equal to approximately 1 connected to said integrating network; a first discharge device having a pair of principal electrodes and a control electrode; a second discharge device having a pair of principal electrodes and a control electrode; a first biasing means for supplying a first bias potential in circuit with the control electrode of said first device; a second biasing means for supplying a second bias potential of greater magnitude than said first biasing potential in circuit with said control electrode of said second device; means for connecting the output of said resonant network in circuit with the control electrodes of both said devices to tend to counteract said first and second biasing potentials; indicating means in circuit with the principal electrodes of said first and second devices; said first and second biasing means including in common first variable impedance means to set said biasing means so that said devices indicate that the welding current lies above or below a desired magnitude and second variable impedance means to set the extent of the range within which desired welding current may lie.

10. In combination, a first thyratron having an anode, a cathode and a control electrode; a second thyratron having an anode, a cathode and a control electrode; first biasing means for impressing a first biasing potential between said control electrode and said cathode of said first thyratron for maintaining said first thyratron non-conducting; second biasing means for impressing a biasing potential of greater magnitude than said first potential between the control electrode and the cathode of said second thyratron for maintaining said second thyratron non-conducting, said first and second biasing means including in common a first variable impedance for setting the magnitude of said first potential and a second variable impedance for setting the difference between said first and second biasing potentials, and means for impressing a common signal in circuit with said first and second biasing potentials in such a sense that it tends to counteract said biasing potentials.

11. A resistance-welding current indicator for indicating the R. M. S. magnitude of the welding current supplied as pulses at a predetermined frequency comprising means responsive to the welding current for deriving potential pulses corresponding to the welding current pulses; a resonant network tuned to said frequency connected to said responsive means to receive said potential pulses for deriving a peak potential the amplitude of which is substantially proportional to the welding current R. M. S. magnitude, and a circuit responsive to the amplitude of the potential across said resonant network including means for indicating the magnitude of said resonant network potential.

12. An indicator according to claim 11 characterized by the fact that the resonant network has a Q of the order of 1.

13. An indicator according to claim 11 characterized by the fact that the indicating means includes means for indicating separately that the welding current R. M. S. magnitude lies between predetermined limits, is higher than the highest of said limits or it lower than the lowest of said limits.

14. A resistance-welding current indicator for a welder which supplies welding current which is delivered in trains of individual pulses supplied at a predetermined frequency comprising a pick-up circuit adapted to be connected to said welder and responsive to said welding current to produce pulses at said frequency each of which has an amplitude substantially proportional to the R. M. S. magnitude of said welding current and a trigger circuit connected to said pick-up circuit to respond thereto.

15. Apparatus for responding to a periodic current comprising in combination, a first thyratron having an anode, a cathode and a control electrode; a second thyratron having an anode, a cathode and a control electrode; first biasing means for impressing a first biasing potential between said control electrode and said cathode of said first thyratron; second biasing means for impressing a biasing potential of greater magnitude than said first potential between the control electrode and the cathode of said second thyratron, and means for impressing a common signal in circuit with said first and second biasing potentials in such a sense that it tends to counteract said biasing potentials; the said combination being characterized by the fact that the signal impressing means includes a resonant network and an integrating network connected to the resonant network, said resonant network being tuned to the frequency of said current and deriving from said current, through said integrating network, a potential having an amplitude substantially proportional to the R. M. S. magnitude of said current and by means for connecting the resonant network in circuit with the control electrodes and the cathodes of said thyratrons and with said biasing means.

16. Apparatus for responding to a periodic current, comprising in combination, a first thyratron having an anode, a cathode and a control electrode; a second thyratron having an anode, a cathode and a control electrode, first biasing means for impressing a first biasing potential between said control electrode and said cathode of said first thyratron; second biasing means for impressing a biasing potential of greater magnitude than said first potential between the control electrode and the cathode of said second thyratron, and means for impressing a common signal in circuit with said first and second biasing potentials in such a sense that it tends to counteract said biasing potentials; the said combination being characterized by signal impressing means which includes a resonant network tuned to the frequency of said current and deriving from said current a potential having an amplitude substantially proportional to the R. M. S. magnitude of said current and by means for connecting said resonant network in circuit with said control electrodes of said thyratrons and said biasing means to control said thyratrons.

17. Welding current responsive apparatus for a welding circuit including means to be coupled to said welding circuit for deriving a signal which is proportional to the instantaneous magnitudes of the welding current, a resonant network coupled to said coupling means for deriving a periodic signal the amplitude of which is substantially proportional to the root-mean-square of said welding current and means responsive to the amplitude of said periodic signal.

18. Welding current responsive apparatus for a welding circuit including means to be coupled to said welding circuit for deriving a signal which is proportional to the instantaneous magnitudes of the welding current, a resonant network coupled to said coupling means for deriving a periodic signal having a periodicity substantially equal to that of said welding current the amplitude of which is substantially proportional to the root-mean-square of said welding current and means responsive to the amplitude of said periodic signal.

References Cited in the file of this patent

UNITED STATES PATENTS

| | | |
|---|---|---|
| 2,364,645 | Mott et al. | Dec. 12, 1944 |
| 2,370,009 | Clark et al. | Feb. 20, 1945 |
| 2,403,988 | Likel | July 16, 1946 |
| 2,409,888 | Ogden | Oct. 22, 1946 |
| 2,434,603 | Vedder | Jan. 13, 1948 |
| 2,470,067 | Callender et al. | May 10, 1949 |